Patented Oct. 14, 1952

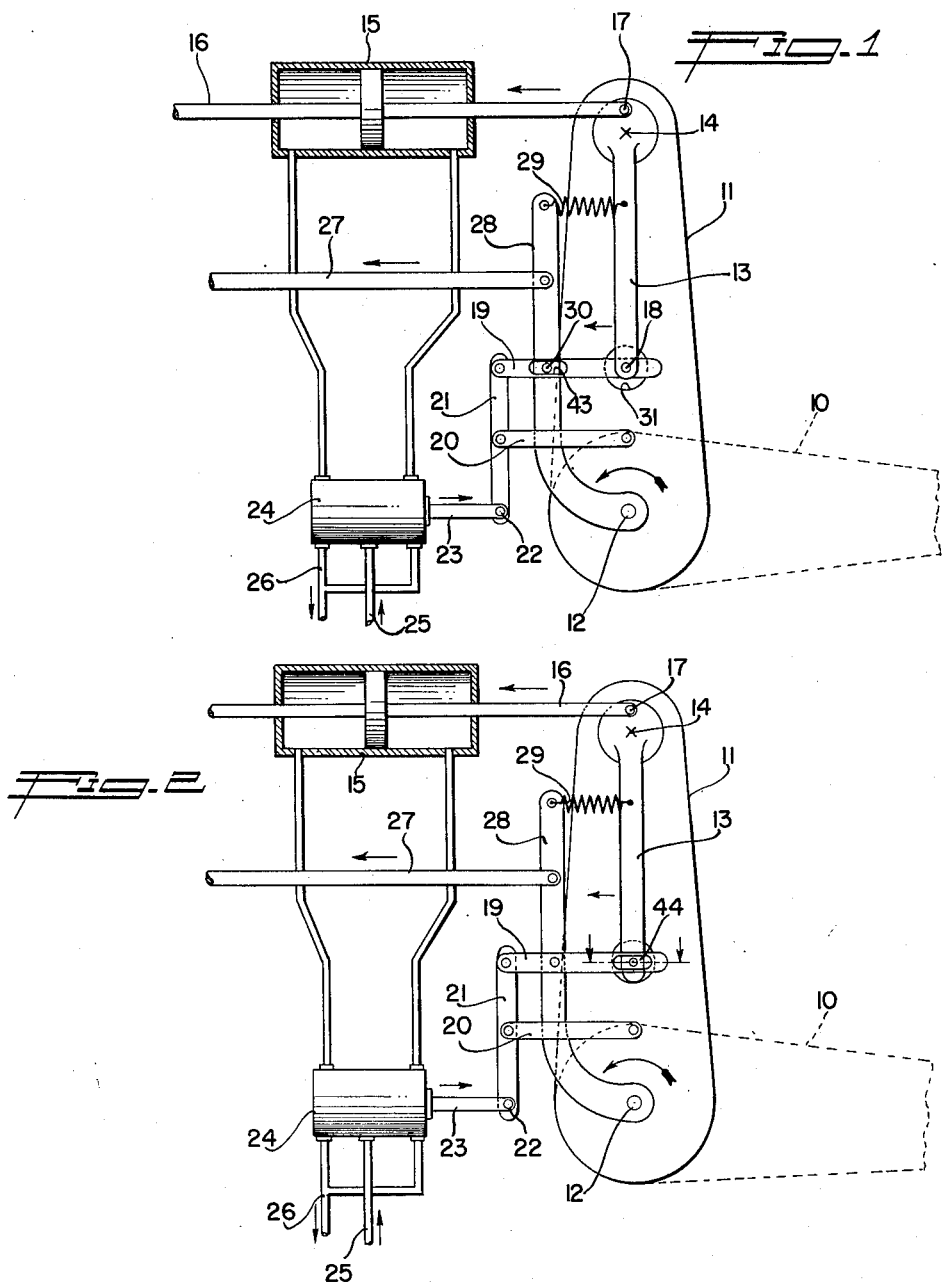

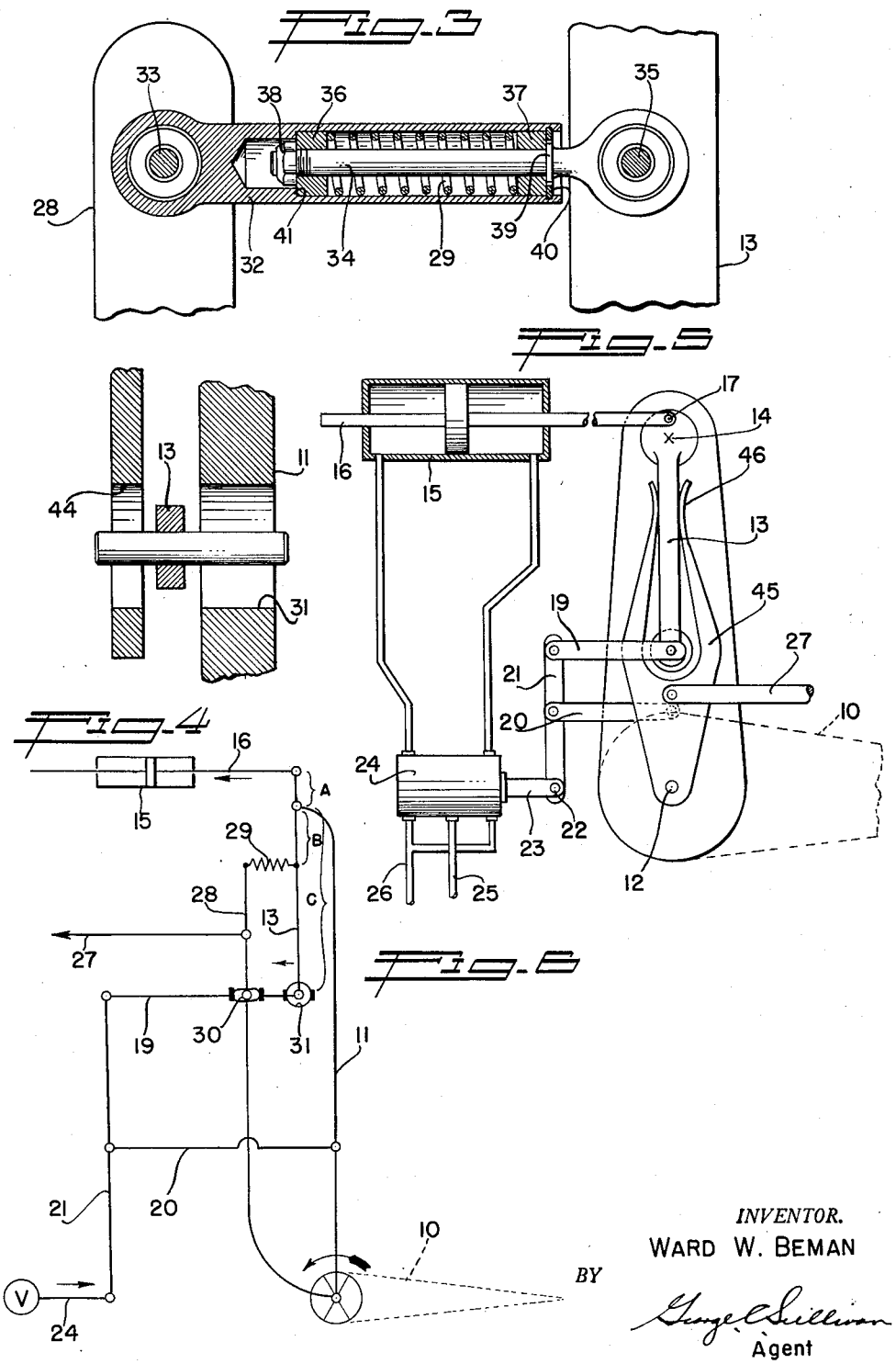

2,613,890

UNITED STATES PATENT OFFICE 2,613,890

VARIABLE RATIO BOOSTER SYSTEM

Ward W. Beman, Glendale, Calif., assignor to Lockheed Aircraft Corporation, Burbank, Calif.

Application August 2, 1946, Serial No. 687,997

10 Claims. (Cl. 244—85)

This invention relates to power aided or servo boost systems of the hydraulic type wherein the pilot retains a proportional feel of the forces applied to or fed back from an aerodynamic control surface.

The present invention particularly relates to the provision of both low and high boost ratios in a hydraulic boost system such as is disclosed in the application of Robert R. Richolt, Serial No. 658,625, filed April 1, 1946. In such a power booster system the portion of the control surface load carried by the pilot's control provides a "feel" proportional to the load on the control surface. When high boost ratios are used, such as the pilot supplying, say, ten per cent of the required force, and the hydraulic power cylinder supplying the remaining ninety per cent, the system is liable to become irreversible at low aerodynamic loads because of the friction inherent in the pilot's control may equal or exceed the pilot's ten per cent share of the load. Also, aerodynamic forces feeding back to the pilot, in effect, act against the reversed boost ratio, preventing the control going to neutral.

It is accordingly an important object of this invention to provide means to convert a high boost ratio system of the type described into a low boost ratio system for operation at low aerodynamic loading, the change from low to high boost preferably being made at a load above the friction load inherent in the entire system providing for ready reversibility in response to aerodynamic loads on the control surface operated by the booster system.

It is also an object of this invention to provide an improved booster system wherein the boost ratio is automatically operable at a low ratio up to a predetermined load and thereafter functions at a high boost ratio adequate to give the pilot control under normal and high load conditions. To this end I provide a preloaded spring device which transmits forces at a low boost ratio within its preloaded range and converts the booster system to the selected high ratio upon deflection of said spring device. Desirably, the preload is selected to overbalance the inherent friction in the pilot's remote control, to enable aerodynamic forces to overcome such control friction at the low boost ratio.

Other objects and features of the invention will be readily understood from the following detailed description of typical preferred forms of the invention wherein reference will be made to the accompanying drawings in which:

Figure 1 is a diagrammatic showing of a hydraulic booster system embodying the preferred form of this invention, wherein the mechanical linkage to the hydraulic valve remains in phase with the feel lever;

Figure 2 is a diagrammatic showing of a similar hydraulic booster system wherein the valve linkage is permitted some lost motion relative to the feel lever, this variation being suitable to control surfaces of low inertia;

Figure 3 is a detail section of a double acting preloaded spring, compression or extension of which shifts from low to high boost ratio;

Figure 4 is a fragmentary section on the line 4—4 of Figure 2, showing the lost motion between the feel lever and horn;

Figure 5 is a diagrammatic showing of a modification of the device of this invention; wherein the change in boost ratio is gradual; and, Figure 6 is a force diagram corresponding to Figure 1.

As shown:

I have shown two very similar versions of dual boost ratio systems in Figures 1 and 2, that of Figure 1 being preferable for large airplanes wherein the control surface has a high moment of inertia, while that of Figure 2 is satisfactory for control surfaces of low moment of inertia, as in small fighter airplanes.

In both Figures 1 and 2, a control surface such as a rudder aileron or elevator 10 has a horn 11 rigid therewith, both being pivoted at 12. A feel lever 13 is pivotally mounted at 14 in the outer end of the horn 11 and a power booster cylinder 15 has its piston rod 16 connected at 17 eccentric to the axis 14 of the feel lever 13. The lower end of the feel lever 13 has a pivot connection 18 to one corner of a parallelogram linkage including an upper link 19, a center link 20 and a vertical link 21, the free end of the latter being pivotally connected at 22 to the stem 23 of a hydraulic valve 24.

The various hydraulic lines and the valve are so arranged that a fluid supply line 25 is connected to the left end of the power cylinder 15 when the valve stem is moved to the right, and the right end of the cylinder is connected through the valve to a fluid return connection 26 when the pilot's control (not shown) pulls a rod 27 to the left, acting through an auxiliary lever 28 to rotate the feel lever 13 clockwise in its pivot 14. The actual transmission of the pilot's force on rod 27 to the feel lever 13 is either through a spring 29 or through a connection 30 between the auxiliary lever 28 and the upper link 19 of the valve linkage.

The normal operation of the foregoing described boost system depends upon the balancing of the pilot's manual force, applied through the rod 27, about the feel lever pivot 14 by the force developed in the booster cylinder 15. Thus in low boost the boost ratio is a function of the lever arms A an B in Figure 6, whereas the high boost ratio is a function of A and C, in both cases the pilot and power cylinder forces acting in the same direction against the horn 11 to move the control surface 10. The low boost ratio shown in Figures 1 and 2 is approximately 1 to 2 so that when the pilot releases the controls the control surface is at a 2 to 1 ratio in returning the controls to neutral, it being necessary for the control surface to overcome twice the combined pilot control and valve friction under such conditions instead of this friction load at the reversed high boost ratio.

In the operation of the boost system per se, as described in the previously mentioned application of Robert R. Richolt, the connection at the lower end of the feel lever 18 operates between stops formed by an enlarged opening 31 in the horn 11, the motion permitted being enough to fully open the hydraulic valve 24 in either direction. When the pilot manually changes the position of his control, thereby pulling or pushing on the rod 27, the feel lever initially pivots about the power cylinder piston connection 17, causing a slight movement of the horn 11 before the valve 24 opens to energize the power cylinder 15. When the power cylinder moves its piston rod, the feel lever then pivots on its axis 14 in the horn, and as long as the pilot continues to hold the feel lever displaced from neutral, the power cylinder will follow up to provide a continuing motion of the horn 11 and its control surface 10. When the pilot merely holds the attained position of the rod 27, the power cylinder will overtravel slightly to return the feel lever to neutral, thus shutting off the valve 24 and hydraulically locking the power cylinder until such time as the pilot again manually moves the control rod 27, unless in the meantime varying aerodynamic forces feeding back through the horn 11 moves the latter enough to displace the feel lever in one direction or the other, in which case the pilot will receive the "feel" of the changing forces.

The arrangement of the spring 29 is shown in more detail in Figure 3, as it is preloaded to be double acting. To this end a casing 32 is pivoted at 33 to the auxiliary lever 28, and a plunger 34 is pivoted at 35 to the feel lever 13, the plunger having collars 36 and 37 slidable thereon, between which the spring 29 is located, the spring being compressed by tightening a nut 38 against the collar 36, while the collar 37 is backed by a shoulder 39 on the plunger 34. The collar 36 is retained in the casing 32 by a snap ring 40. The collar 36 is restrained from movement to the left in the casing by a shoulder 41 therein. With this arrangement a compressive force, sufficient to overcome the spring preload, will move the collar 37 inwardly into the casing 32; while a tensile force, sufficient to overcome the spring preload will pull the collar 36 to the right in the casing 32, either compression or extension of the assembly serving to transfer the pilot's force through rod 27 to the high boost ratio at a connection 42 to the upper link 19 and thence to the connection 18 of the feel lever 13.

In Figure 1 the connection 42 is provided with lost motion by means of an elongated slot 43 in the upper link 19, in order to permit operation of the booster system at the low ratio provided by the preloaded spring 29. With this arrangement the relationship of the valve to the power cylinder is not altered, hence an accurate follow-up control of the valve in relation to the power cylinder and surface movement is obtained. This is desirable in connection with control surfaces having a substantial moment of inertia, as it provides the damping effect of the booster to control instability, chatter or flutter of the surface.

In cases where the control surface is of low inertia, as in fighter aircraft for example, it is permissible to provide the necessary lost motion at the connection 18 between the upper link 19 and the feel lever 13 as by an elongate slot 44 shown in Figures 2 and 4.

Figure 5 discloses a further variation suitable for very large booster systems wherein it might be undesirable to change from low to high boost in one step. In this arrangement the previously described auxiliary lever 28 and spring 29 are replaced by a spring cam or tuning fork 45 providing a rolling contact with the feel lever, light loads at low boost ratio being transmitted through the spring-like tips 46 of the fork, which tips bend progressively as the load increases, to shift the transfer point farther down on the feel lever to increase the boost ratio as the load increases.

It will be evident from the foregoing that this present invention provides for more ready reversal of control surfaces in response to varying aerodynamic forces thereon, since the inherent mechanical friction of the booster per se as well as the usual cable system leading to the pilot's position renders a high ratio boost system sluggish or even irreversible at light loads as under cruising landing and take-off, involving only gradual movement of the several control surfaces, or during change of the trim tabs.

Having described only typical forms of the invention, I do not wish to be limited to the specific details herein set forth, but wish to reserve to myself any variations or modifications that may appear to those skilled in the art and/or fall within the scope of the following claims.

I claim as my invention:

1. In an aircraft control system comprising a pilot-operated element, and a member to be controlled in step with the motion of said element, a power mechanism connected to operate said member in parallel with and supplementary to the pilot-operated element, linkage interconnecting and separately applying the forces from both the power mechanism and the pilot-operated element to the member, said linkage being arranged to balance the power mechanism against the pilot-operated element about a pivot point common to both and to said member whereby to provide a direct mechanical feel in the pilot-operated element of the forces applied to the member to be controlled, and yielding means positioned between the pilot operated element and said linkage operating to vary the effective point of application of said pilot operated element to said interconnecting linkage whereby to increase the leverage ratio thereof as the force applied to said element increases.

2. In an aircraft control system comprising a pilot-operated element, and a member to be controlled in step with the motion of said element, a power mechanism connected to operate said member in parallel with and supplementary to the pilot-operated element, linkage interconnecting and separately applying the forces from both the power mechanism and the pilot-operated element to the member, and means providing a preloaded yieldable variable leverage connection between said pilot controlled element and said linkage, said connection increasing the leverage of the pilot operated element as it yields under increasing forces applied thereto, said linkage being arranged to balance the power mechanism against the pilot-operated element about a pivot point common to both and to said member whereby to provide a direct mechanical variable ratio feel in the pilot-operated element of the forces applied to the member to be controlled.

3. In a control mechanism of the class described, a movable element adapted to be controlled, a power booster, a manually movable member, and interconnecting mechanism providing for the operation of said element under simultaneous direct mechanical control by said member and by said power booster, comprising a feel lever pivoted at one end in an operating relationship to said movable element, and having a lost motion connection at the other end to said manually movable member, a preloaded yieldable connection between said member and an intermediate pivotal connection to said feel lever, whereby the yieldable connection acts until the slack in the lost motion connection is taken up, and means eccentrically connecting said power booster to the first mentioned pivot of said feel lever whereby the power applied by said booster is balanced against the manual force applied through said member to provide a proportionate feel of the total load applied to the movable element.

4. In a control mechanism of the class described, a movable element adapted to be controlled, a power booster, a manually movable member, and interconnecting mechanism providing for the operation of said element under simultaneous direct mechanical control by said member and by said power booster, comprising a feel lever pivoted near one end in an operating relationship to said movable element, and having a lost motion connection at the other end to said member, a yieldable pivotal connection between said member and an intermediate position on said feel lever, whereby the yieldable connection acts until the slack in the lost motion connection is taken up, means eccentrically connecting said power booster to the first mentioned pivot of said feel lever whereby the power applied by said booster is balanced against the manual force applied through said member to either of said pivots to provide a proportionate feel of the total load applied to the movable element, and means for energizing said power booster in response to unbalanced conditions between said booster eccentric connection and said manually movable member connection to said feel lever.

5. In an aircraft control system for aircraft control surfaces including a direct manual control and a power booster supplementing the manual force applied through said control, a feel lever having an intermediate pivot associated with the control surface in such a way as to apply forces directly thereto, yieldable means varying the point of application of the direct manual control through a range of positions along the length of said feel lever on one side of said pivot, whereby to vary the leverage in proportion to the variation in forces imposed by the direct manual control and means connecting the power booster to the other end of said feel lever whereby the respective radii of the two connections relative to the intermediate pivot of said lever determines the division of the control forces between the manual control and the power booster.

6. In an aircraft control system for aircraft control surfaces including a direct manual control and a power booster supplementing the manual force applied through said control a feel lever having an intermediate pivot associated with the control surface in such a way as to apply forces directly thereto, means yieldable in response to forces imposed thereon connecting the direct manual control to varied positions along the length of said feel lever, whereby to vary the leverage of said manual control on one side of said pivot means connecting the power booster to the other end of said feel lever whereby the respective radii of the two connections relative to the intermediate pivot of said lever determines the division of the control forces between the manual control and the power booster, and control means for said power booster also connected to said feel lever and adapted to be energized by unbalanced movement of said lever.

7. In a power control system for aircraft control surfaces including a direct manual control and a power booster supplementing the manual force applied through said control a feel lever having an intermediate pivot associated with the control surface in such a way as to apply forces directly thereto, means connecting the direct manual control to alternative positions along one end of said feel lever one of which is yieldingly preloaded to transfer the connection to the other when the preload is exceeded whereby the respective radii of the manual and power connections relative to the intermediate pivot of said lever determines the division of the control forces between the manual control and the power booster, control means for said power booster also connected to said feel lever adapted to be energized by unbalanced movements of said lever and means limiting unbalanced movements of said lever whereby to directly transmit the manual control to said control surface when said limiting means is engaged.

8. An aircraft control system including a pivoted control airfoil a power booster adapted to supply a portion of the force required to move the control airfoil a pilot-operated primary control adapted to supply the remaining force required to move the control airfoil, means for connecting said power booster and said primary control to the control airfoil said means being adapted to divide the forces therebetween and a secondary preloaded spring connection between said primary control and said connecting means adapted to balance the primary control at a lower boost ratio up to the point of yielding thereof.

9. An aircraft control system including a pivoted control airfoil, a power booster adapted to be operatively connected to the control airfoil to supply a major portion of the force required to move the control airfoil a pilot operated manual control also adapted to be operatively connected to the control airfoil in parallel relationship with said power booster to supply the remainder of the force required to move the same, lever means connected between and separately applying said power booster and said manual control to said control airfoil the points of connection of said power booster and manual control to said last mentioned means being so located as to balance said manual control against said power booster whereby to divide the force required by the control airfoil therebetween in a predetermined ratio and yielding means connected between the manual control and the lever means to vary the effective leverage of said manual control on said lever means relative to the power booster whereby to vary the boost ratio of said power booster relative to the manual control.

10. An aircraft control system including a pivotal control airfoil, a power booster adapted to be operatively connected to the control airfoil of supply a major portion of the force required to move the control airfoil, a pilot operated manual control also adapted to be operatively connected to the control airfoil in parallel relationship with said power booster to supply the remainder of the force required to move the same means connected between and separately applying said power booster and said manual control to said control airfoil the points of connection of said power booster and manual control to said last mentioned means being so located as to balance said manual control against said power booster whereby to divide the force required by the control airfoil therebetween in a predetermined ratio and means connected between the manual control and said last mentioned means to vary the effective point of application of said manual control force to said means for applying said forces whereby to vary the leverage thereof to vary the boost ratio of said power booster.

WARD W. BEMAN.

REFERENCES CITED

The following references are of record in the file of this patent:

UNITED STATES PATENTS

| Number | Name | Date |
|---|---|---|
| 1,339,332 | Greenly | May 4, 1920 |
| 2,222,886 | Voight | Nov. 26, 1940 |
| 2,284,289 | Newton | May 26, 1942 |
| 2,366,382 | Burton | Jan. 2, 1945 |
| 2,370,844 | Davis | Mar. 6, 1945 |
| 2,424,901 | Richolt | July 29, 1947 |
| 2,429,185 | Hukill | Oct. 14, 1947 |
| 2,515,475 | Shoemaker | July 18, 1950 |

FOREIGN PATENTS

| Number | Country | Date |
|---|---|---|
| 597,182 | France | Aug. 22, 1925 |
| 346,729 | Great Britain | of 1929 |